(12) United States Patent
Liu (10) Patent No.: US 6,540,071 B2
(45) Date of Patent: Apr. 1, 2003

(54) CASE FOR HOLDING TWO COMPACT DISCS

(76) Inventor: Tak Lun Liu, 6 Shouson Hill Road #2, Hong Kong (HK)

( * ) Notice: Subject to any disclaimer, the term of this patent is extended or adjusted under 35 U.S.C. 154(b) by 0 days.

(21) Appl. No.: 10/003,827

(22) Filed: Oct. 22, 2001

(65) Prior Publication Data

US 2002/0038770 A1 Apr. 4, 2002

Related U.S. Application Data

(63) Continuation of application No. 09/207,175, filed on Dec. 8, 1998.

(30) Foreign Application Priority Data

Dec. 10, 1997 (GB) .............................................. 9726136

(51) Int. Cl.$^7$ .............................................. B65D 85/57
(52) U.S. Cl. .................................... 206/308.1; 206/310
(58) Field of Search .............................. 206/308.1, 309, 206/310, 311, 312, 748

(56) References Cited

U.S. PATENT DOCUMENTS 6,286,671 B1 * 9/2001 Liu et al. .................. 206/308.1

* cited by examiner

*Primary Examiner*—David T. Fidei
(74) *Attorney, Agent, or Firm*—Hodgson Russ LLP (57) ABSTRACT

A case for holding two compact discs or the like including first and second cover parts pivotally connected together so that they can be pivoted between a closed position facing each other and an open position. The cover parts and the structure for pivotally connecting them together is of the type for holding a single compact disc. A tray comprises a planar body portion and an anchor portion, the tray body portion including an annular rosette of fingers on each side thereof for releasably securing a compact disc thereto, the tray body and the tray anchor being pivotally connected together and the tray anchor being secured to one of the cover parts. As a result, when the cover parts are pivoted to an open position the tray body can be pivoted about the tray anchor to facilitate installation and removal of compact discs from both sides of the tray body. Advantageously, the manner in which the tray anchor is secured to the cover parts enables the tray to be readily installed in a standard case for holding one compact disc. The separate tray body and anchor portions together with the nature of the pivotal connection therebetween provide a structure which is strong and long-lasting.

5 Claims, 12 Drawing Sheets

CASE FOR HOLDING TWO COMPACT DISCS

This application is a continuation of U.S. Ser. No. 09/207,175 filed Dec. 8, 1998.

BACKGROUND OF THE INVENTION

This invention relates to the art of storage cases for compact discs, and more particularly to a new and improved case for holding a pair of compact discs.

In a basic compact disc storage case, a first or front cover part is pivotally connected along one end or edge to a second or rear cover part for opening and closing the storage case. A tray structure mounted within the case is provided with an annular rosette of flexible fingers which releasably engage the central opening of a compact disc for releasably securing the disc to the tray. The plate-like tray typically is snap-fit into the second or rear cover part. An example of a basic storage case for holding a single compact disc is found in U.S. Pat. No. 5,259,498.

Recently, compact disc storage cases have been proposed for carrying two compact discs therein. In a basic two compact disc storage case, the tray is provided with a pair of rosettes of fingers, one on each side of the tray, and the tray is pivotally connected to the case, in particular to walls of one of the cover parts, to provide access to both compact discs held thereon. Examples of storage cases for holding a pair of compact discs are found in U.S. Pat. No. 5,244,085 and British Patent No. 2,261,210.

At least two important considerations arise in designing the structure of a two compact disc storage case. One is the nature of the case in which the tray is contained. In view of the large number and popularity of cases for holding one compact disc, it would be highly advantageous to provide a tray structure for holding two compact discs which readily installs in a standard case for holding one compact disc. This avoids the need to manufacture and store a case of special design for holding two compact discs. Another is durability, strength and wear life of the pivotal connection of the tray in the case. Each time the case is opened the tray itself may be pivoted back and forth several times as the user selects a compact disc and removes it from the tray or secures it to the tray after use. Also, as the user manipulates the tray and the rosettes of fingers thereon during removal and replacement of the compact disc, such manipulation imposes stress on the pivotal connection.

SUMMARY OF THE INVENTION

It is, therefore, a primary object of this invention to provide a new and improved case for holding a pair of compact discs.

It is a further object of this invention to provide such a compact disc storage case wherein the tray structure for holding a pair of compact discs readily installs in a standard case for holding one compact disc.

It is a further object of this invention to provide such a compact disc storage case having a new and improved structure for providing pivotal movement of the compact disc holding tray within the case.

It is a more particular object of this invention to provide such a tray pivot structure which has improved durability and strength.

It is a further object of this invention to provide such a compact disc storage case which is convenient and economical to manufacture and easy to use.

The present invention provides a case for holding two compact discs or the like including first and second cover parts having a pivotal connection so that they can be moved between a closed position facing each other and an open position together with a tray comprising a planar body portion and an anchor portion, the tray body portion including means on each side thereof for releasably securing a compact disc thereto, means for pivotally connecting the tray body and the tray anchor together and means for securing the tray anchor to the pivotal connection of the cover parts. As a result, when the cover parts are pivoted to an open position the tray body can be pivoted about the tray anchor to facilitate installation and removal of compact discs from both sides of the tray body. Advantageously, the manner in which the tray anchor is secured to the cover parts enables the tray to be readily installed in a standard case for holding one compact disc. The separate tray body and anchor portions together with the nature of the pivotal connection therebetween provide a structure which is strong and long-lasting.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

Figure 1:
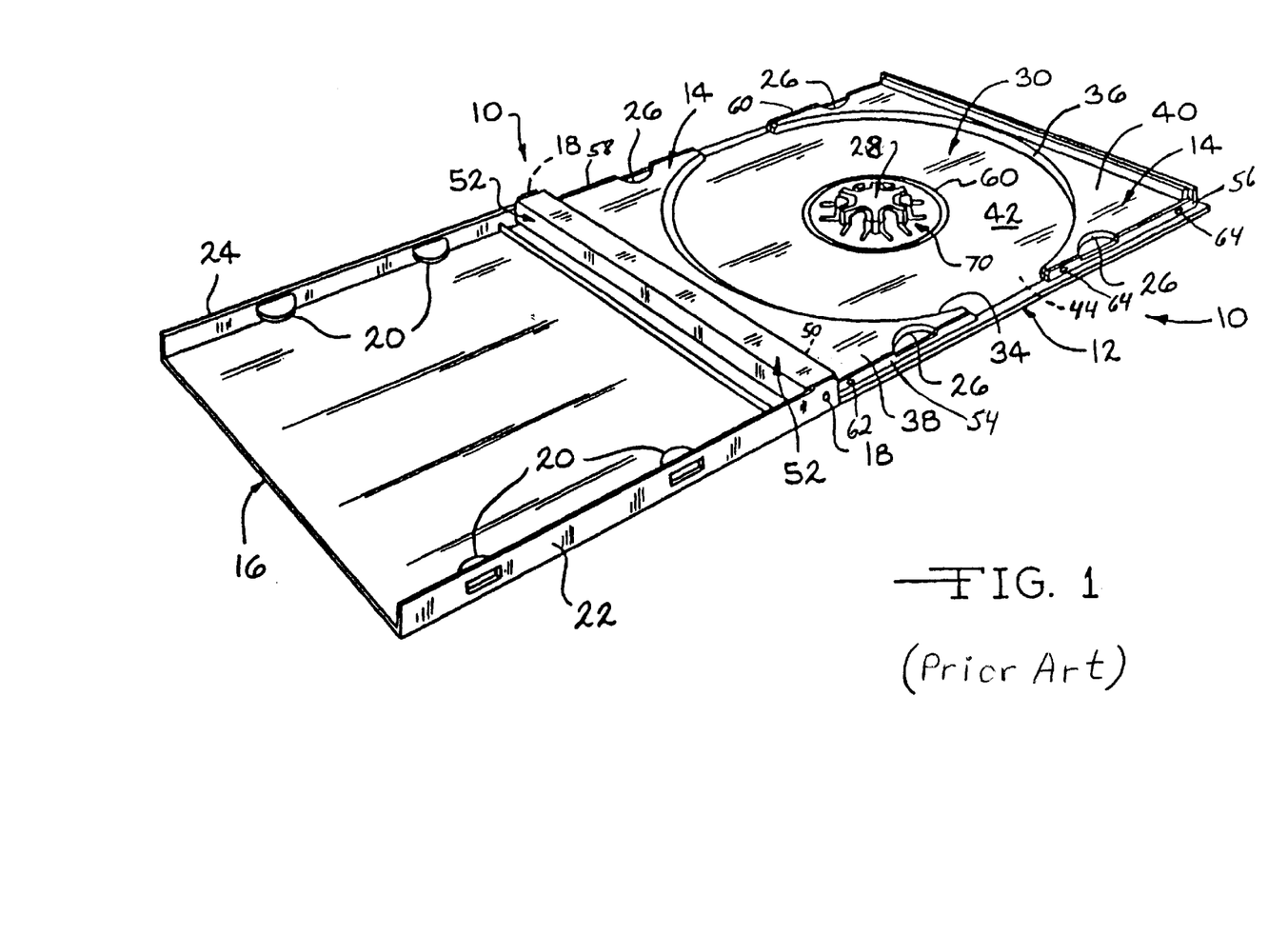
FIG. 1 is a perspective view of a standard compact disc storage case for holding one compact disc.

Referring first to FIG. 1, there is shown a standard case 10 for storing a single compact disc (disc not shown) comprising a rectangular thermoplastic base 12, a rectangular compact disc holding tray 14 which is received in base 12 and a rectangular thermoplastic cover 16 which is hinged at 18 to base 12. The cover 16 pivots toward and snap fits onto the base 12 to enclose tray 14 in a rectangular cavity formed by base 12 and cover 16. Cover 16 has tabs 20 extending inwardly from sidewalls 22 and 24 of cover 16 which tabs 20 are received in recesses 26 formed in base 12 and tray 14. A paper insert of graphical or textual promotional material (not shown) fits between tabs 20 and the body of cover 16. The package 10 protects the compact disc contained therein from abient conditions including dust, dirt and excessive handling. The disc comprises information recorded on a spiral digital encoded track formed in one side of a thin circular metal disc substrate encased within a protective relatively thin circular transparent plastic casing in a known manner. The disc is held on tray 14 by means of the central opening in the disc fitting onto an annular array of fingers 28 in a manner which will be described presently.

As shown in FIG. 1, tray 14 is a rectangular relatively thin plate-like member which conforms to the shape of and is closely received in the rectangular cavity defined by base 12 and cover 16. Tray 14 is formed of molded thermoplastic material such as general purpose polystyrene. Tray 14 is planar molded sheet material formed with a circular recess 30 defined by two semi-circular opposing sides 34 and 36 from respective planar surfaces 38 and 40. Recess 30 receives the compact disc and has a planar surface 42. Tray 14 has an oppositely facing planar surface 44, and the two surfaces 42 and 44 define therebetween a thin, plate-like structure. An offset flange 50 on one end of tray 14 is received within a walled region 52 at the end of base 12 hinged to cover 16 in a known manner. The side edges of tray 14 are closely adjacent upstanding side walls of base 12, the side walls being designated 54, 56, 58 and 60 in FIG. 1. Tray 14 is secured in base 12 by engagement between bosses or projections (not shown) on the side edges of tray 14 and apertures provided in the side walls of base 12. One such aperture 62 is shown in side wall 54 and other such apertures 64 are shown in side wall 56.

An annular step 70 is formed in tray surface 42 which serves to support a compact disc (not shown) held by tray 14. Within step 70 there is formed the array or arrangement 28 of a plurality of fingers in annularly spaced relation relative to the center of the circle defined by step 70 which center serves as a reference point. In the tray 14 of the present illustration there are six equally annularly spaced fingers, but the particular number of fingers is a matter of design choice. The fingers of array 28 are molded with the remainder of the body of tray 14 and are integral therewith. The fingers are resilient and serve to receive the central opening of a compact disc (not shown) for releasably holding the disc on tray 14 in a known manner.

Figure 2:
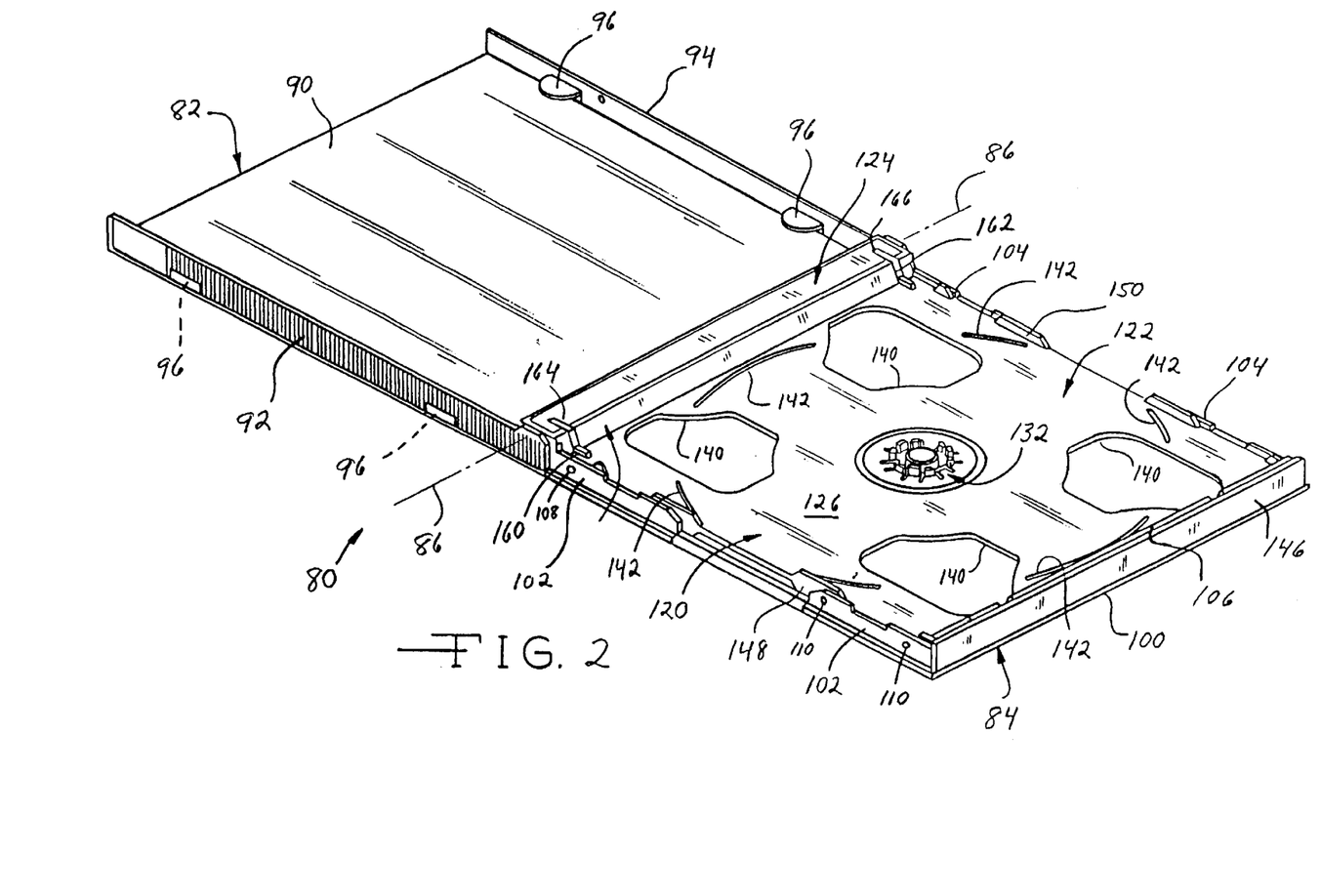
FIG. 2 is a perspective view of a compact disc storage case according to the present invention showing the tray adjacent one of the cover parts.
Figure 3:
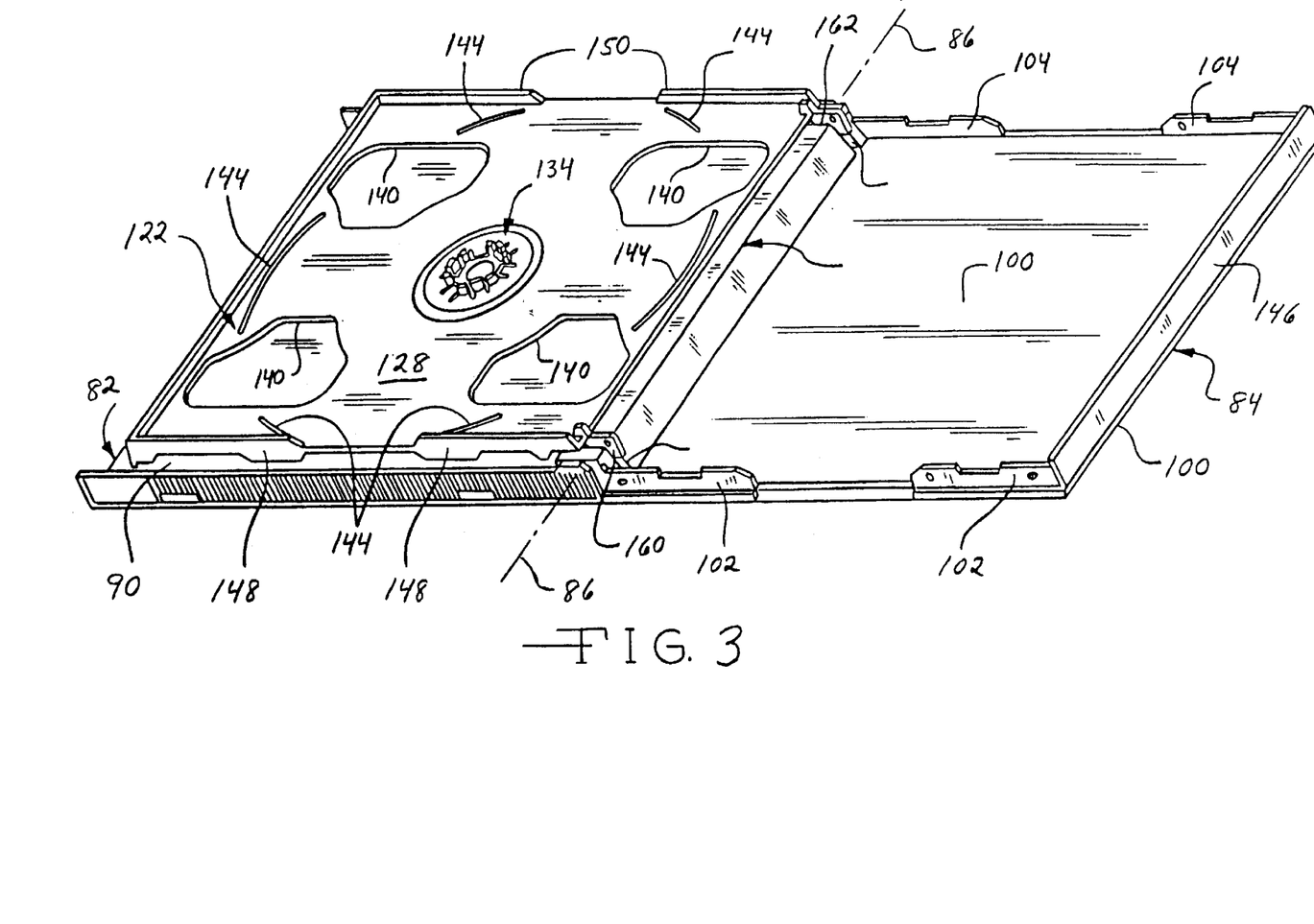
FIG. 3 is a perspective view similar to FIG. 2 showing the tray pivoted to a position adjacent the other of the cover parts.

Referring now to FIGS. 2 and 3, there is shown a case 80 for holding two compact discs according to the present invention. Case 80 includes a first cover part 82 and a second cover part 84 pivotally connected together along an axis designated 86. Case 80 is shown in the fully open position wherein parts 82 and 84 define therebetween an angle of 180°, and the parts are pivotally moved to a closed position where they face each other in a known manner. The parts 82 and 84 are made of thermoplastic material which is well known in the art. In accordance with the present invention, the parts 82 and 84 are of the type used in a standard case for holding a single compact disc, i.e., parts 82 and 84 are similar to cover 16 and base 14, respectively, in the case 10 of FIG. 1.

The first cover part 82 comprises a solid rectangular base plate 90 and a pair of upstanding sidewalls 92 and 94 as shown in FIG. 2. Tabs 96 are formed to extend inwardly from walls 92, 94 and spaced from base 90 for the purpose of retaining a paper insert of graphical or textual promotional material (not shown). The second cover part 84 comprises a solid rectangular base plate 100, a pair of upstanding sidewalls 102 and 104 and an upstanding end wall 106 joining the sidewalls 102, 104 as shown in FIG. 3. Apertures 108 and 110 walls in 102 and 104 correspond to apertures 62 and 64 in tray 10 of FIG. 1.

The walls 102, 104 of cover part 84 are arranged so that they fit closely within walls 92, 94 of part 82 when the two parts are pivoted to a closed position, and end wall 106 of part 84 completes the enclosure of the interior region between the closed cover parts 82 and 84. A pivot hinge is defined, for example, by cylindrically shaped projections, one of which is designated 108 in FIGS. 2 and 3, extending inwardly from walls 92, 94 which fit in corresponding circular openings (not shown in FIGS. 2 and 3) in walls 102, 104 in a known manner, the axes of the projections and the centers of the openings being the pivot axis 86.

In accordance with the present invention, case 80 further comprises a tray 120 for holding a pair of compact discs and including a tray body portion 122 pivotally connected to a tray anchor portion 124 which is secured to one of the cover parts 82, 84. Tray body 122 is in the form of a plate having oppositely disposed surfaces 126 and 128 which are seen in FIGS. 2 and 3, respectively, which show tray body 122 adjacent cover parts 84 and 82, respectively. Tray body 122 includes means on each surface 126, 128 for releasably securing a compact disc. In particular, a first rosette 132 of annularly disposed flexible fingers is formed on surface 126 for releasably securing a compact disc (CD) at the central opening thereof in a known manner. Similarly, a second rosette 134 of annularly disposed flexible fingers is formed on surface 128 for releasably securing a compact disc at the central opening thereof in a known manner. Tray body 122 includes a plurality of openings 140 extended therethrough, in the present illustration four, through which the user may place a finger around the edge of a CD to facilitate removal from the tray. Surface 126 includes arcuate ribs 144 formed thereon to serve as a guide for the edge of a CD carried on that surface. Tray body 122 also is provided with an end wall 146 and a pair of side walls 148 and 150 which define a rim around the periphery of tray body 122 to provide support for protecting the CDs carried thereby when the cover parts 82 and 84 are closed. Tray body can be of the same plastic material as cover parts 82, 84.

Tray body 122 is provided on the end opposite wall 146 with a pair of spaced apart substantially parallel arms or tabs 160 and 162 which are disposed in planes substantially perpendicular to the plane of tray body 122. Arms 160 and 162 are of substantial thickness and are received in recesses 164 and 166, respectively, formed in tray anchor portion 124 for providing the pivotal connection between tray body 122 and tray anchor 124. The structure for pivotally connecting the arms or tabs 160, 162 in the recesses 164, 166 will be described in detail presently. Tray anchor portion 124 is an elongated rectangular structure molded from the same plastic material as tray body 122 and the cover parts 82, 84. Anchor portion 124 is disposed so that the longitudinal axis thereof is disposed substantially parallel to the axis 86 of the pivotal hinge connection between cover parts 82, 84. The structure of the tray anchor portion and the manner on which it is secured to one of the cover parts 82, 84 will be described in detail presently.

Figure 4:
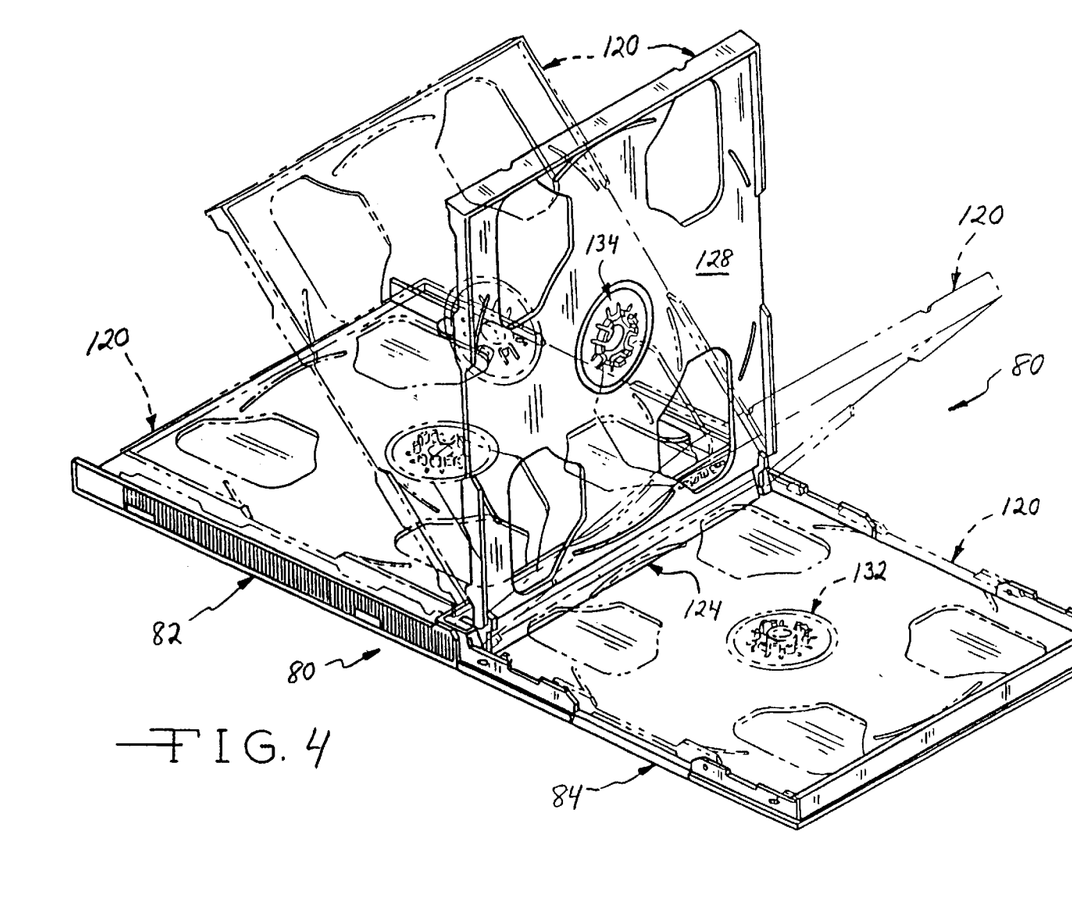
FIG. 4 is a perspective view similar to FIGS. 2 and 3 showing the tray in various positions during pivotal movement between the two cover parts.

FIG. 4 shows the various possible locations of tray 120 as it is pivoted through 180 degrees of pivotal movement between positions in facing engagement with covers parts 82 and 84. The solid line representative of tray 120 in FIG. 4 shows the mid-way or 90 degree position, and the broken line representations show various other locations of tray 120 during the pivotal movement thereof. Thus a user simply can grasp tray 120 by hand and move it as shown in FIG. 4 to gain access to either side of tray 120 to remove a compact disc for use and to replace the CD on tray 120 after its use.

An important advantage of the provision of tray anchor portion 124 separate from tray body portion 122 is that the pivotal connection between the tray body and anchor portions 122 and 124, respectively, is durable, strong and long lasting. This is a result of the provision of the arms or tabs 160 and 162 on tray body portion 122 which are received in the recesses 164 and 166, respectively, in the tray anchor portion 124. Any laterally directed forces or stresses imposed on the pivotal connection will not disengage or dislodge the connection because the arms 160 and 162 are supported and contained in a lateral sense by the recesses 164 and 166 in tray anchor portion 124. In addition, the pivotal connections are located laterally inwardly of the side edges of the tray body portion and thus are isolated from any stresses acting along the edges or at the corners of tray body portion 122. The foregoing is important when one considers the various angular positions in which a user can manipulate tray body 122, as illustrated in FIG. 4, with the result that a wide variety of magnitudes and directions of forces or stresses can be imposed on tray body 122 by the hands of the user. Another need for a strong, durable pivotal connection arises from the fact that during the life of a compact disc case, the tray body 122 typically will be moved back and forth a number of times significantly greater than the number of times the cover parts 82, 84 are opened and closed. In other words, once a user opens the cover parts 82, 84 he may pivot tray body 122 back and forth a number of times such as to inspect the CD's before selection and removal from the case.

Figures 5, 6:
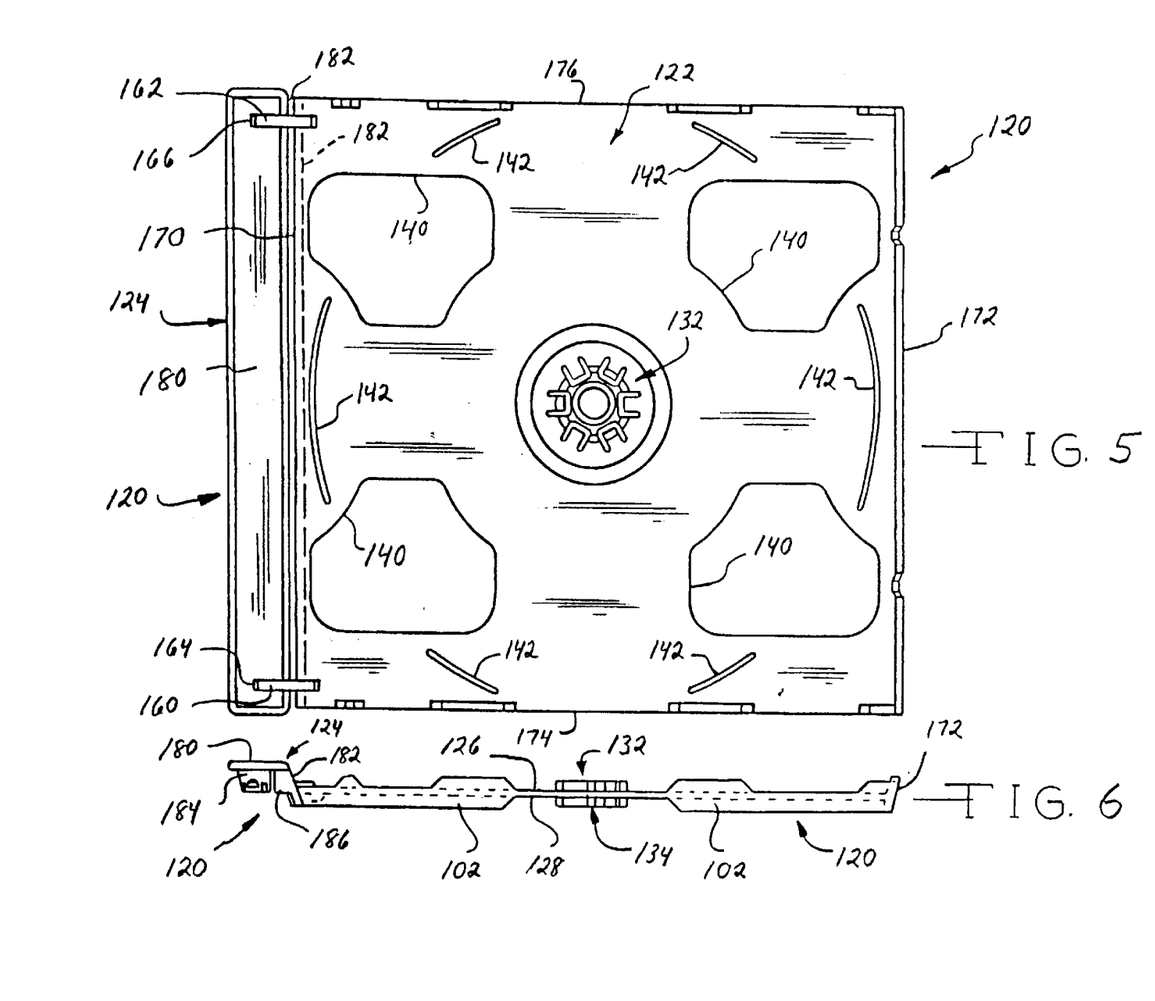
FIG. 5 is a plan view of the tray structure in the case of FIGS. 2–4 comprising a tray anchor portion and a tray body position.
FIG. 6 is a side elevational view of the tray structure of FIG. 5.

The tray body 122 and tray anchor 124 combination is shown in further detail in FIGS. 5 and 6. The arms or tabs 160 and 162 of tray body portion 122 are of a width or thickness such that they fit closely but movably within the recesses 164 and 166, respectively, of tray anchor portion 124. Tray body 122 has a pair of end edges 170 and 172 which are spaced-apart and mutually parallel. In the assembled case 80 as shown in FIGS. 2–4, edges 170, 172 also are substantially parallel to pivot axis 86. Edges 170 and 172 are joined by a pair of mutually parallel side edges 174 and 176. The arms or tabs 160 and 162 extend from one of the end edges, for example edge 170, and are spaced inwardly of side edges 174 and 176 as shown in FIG. 5. Anchor portion 124 includes a top wall 180 extending along the entire length of portion 124, an inclined front wall 182 extending from top wall 180 toward surface 126 of tray body 122 and extending along substantially the entire length of portion 124 and a series of wall-like members, two of which are designated 184 and 186 in FIG. 6, extending from walls 180 and 182 for a purpose which will be described.

The combination of tray body portion 122 and tray anchor portion 124 is shown in FIGS. 5 and 6 in its assembled condition before installation in case 80. In accordance with another aspect of the present invention, in the assembled condition of FIGS. 5 and 6, and prior to installation in case 80, the portions 122 and 124 are locked or maintained in the relative positions shown in FIGS. 5 and 6, i.e. tray body 122 cannot be pivoted relative to tray anchor 124. However, once the combination of FIGS. 5 and 6 is installed in case 80, tray body portion 122 is pivotally movable relative to tray anchor portion 124 as shown in FIG. 4. This renders the tray body and anchor combination structure compatible with automatic machinery for assembling the parts of compact disc holding cases such as case 80. This is provided by co-operating structures on arms 160 and 162, in recesses 164 and 166 and on the part 82 or 84 of case 80 to which anchor portion 44 is secured in a manner which will be described in detail presently.

Figure 7:
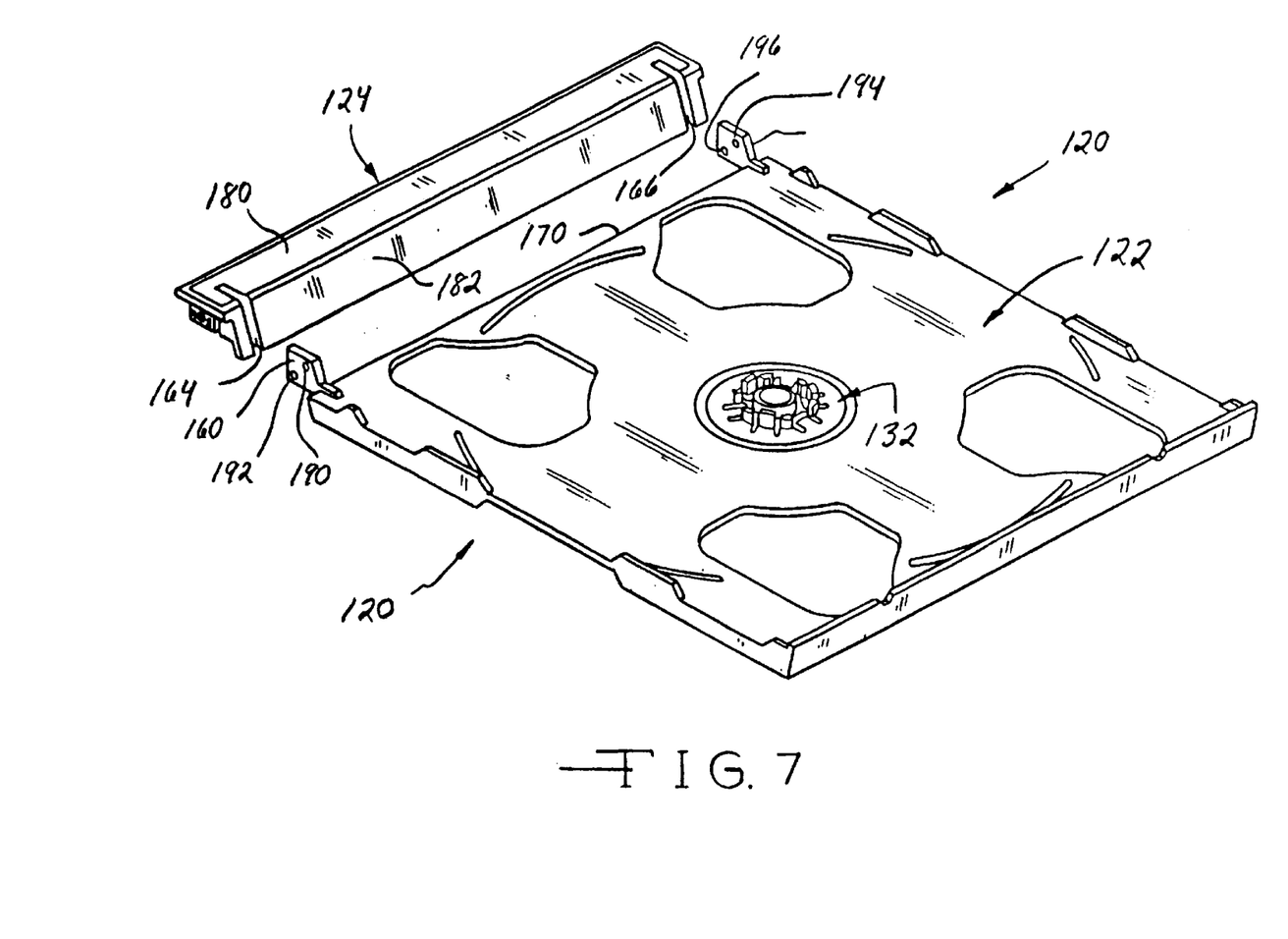
FIG. 7 is a perspective view showing the tray structure of FIGS. 5 and 6 before the anchor and body portions are pivotally connected together.

FIG. 7 shows the tray body portion 122 and tray anchor portion 124 before being connected together. As shown in FIG. 7 each of the arms or tabs 160 and 162 is provided with a pair of spaced-apart apertures or openings extending therethrough. In particular, tab 160 is provided with openings 190, 192 and tab 162 is provided with openings 194, 196. On each tab, one of the openings receives a stud or projection (not shown in FIG. 7) on tray anchor 124 rotatably therein to define the pivotal connection between tray body 122 and tray anchor 124. In the illustrative device shown, the opening 190 on tab 160 and the opening 194 on tab 164 define the pivotal connection with the co-operating studs (not shown). On each tab, the other opening co-operates with another stud or projection (not shown in FIG. 7) on tray anchor 124 to lock tray body 122 and tray anchor 124 against pivotal movement when connected together and prior to being assembled in case 80. In the illustrative device shown, the opening 192 on tab 160 and the opening 196 on tab 162 co-operate with studs or projections (not shown) to define the releasable locking relationship. In accordance with the present invention, when the assembled combination of tray body 122 and tray anchor 124 is assembled into case 80, with tray anchor 124 secured to one of the cover parts 82, 84, the openings 192 and 196 on tabs 160 and 162 no longer are in engagement with the co-operating studs or projections with the result that tray body 122 is freely pivotally movable about its connection to tray anchor 124. The structure for accomplishing this will be shown and described presently.

Figure 8:
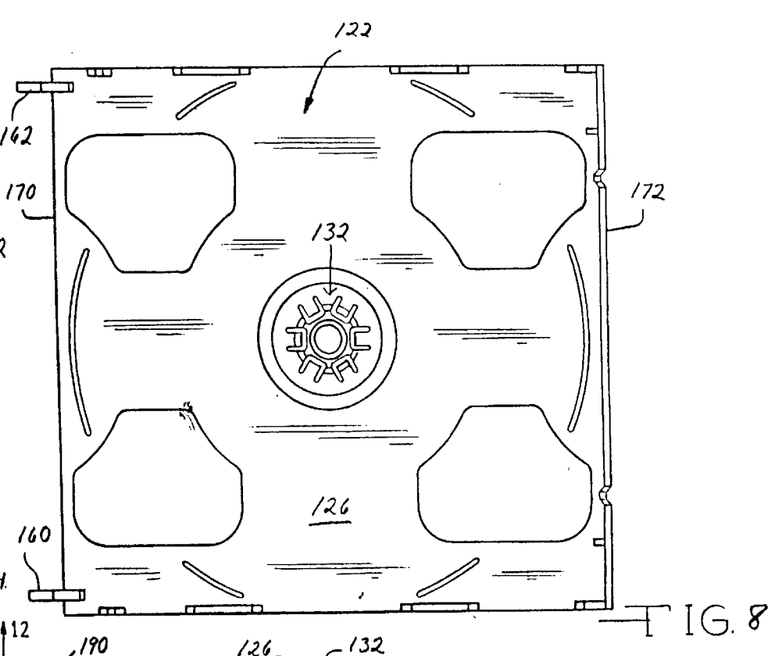
FIG. 8 is a top plan view of the body portion of the tray structure of the present invention.
Figure 9:
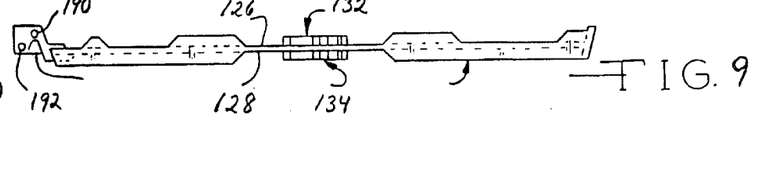
FIG. 9 is a side elevational view thereof.
Figures 10, 11:
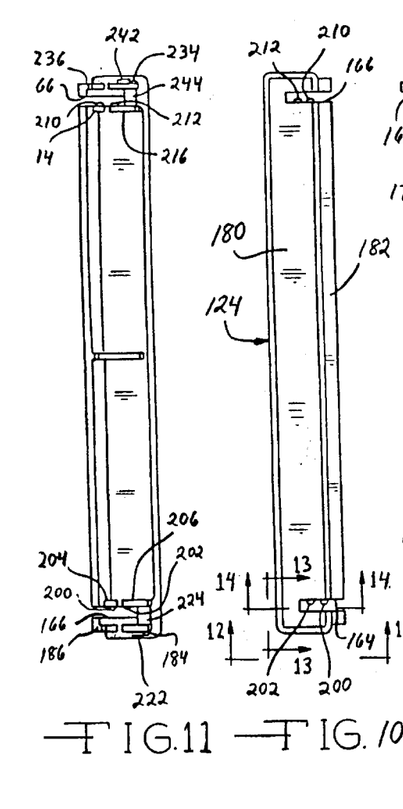
FIG. 10 is a top plan view of the anchor portion of the tray structure of the present invention.
FIG. 11 is a bottom plan view thereof.

FIGS. 8 and 9 show tray body 122 in further detail, and the tray anchor portion 124 is shown in more detail in FIGS. 10 and 11. In the top plan view of FIG. 10 the previously mentioned studs or projections are seen in the recesses 164 and 166. In particular, extending into recess 164 is a first stud or projection 200 for fitting into opening 190 in tab 160 to define one end of the pivotal connection between tray body 122 and tray anchor 124. A second stud or projection 202 extends into recess 164 for fitting into opening 192 in tab 160 to define the releasable locking relationship between tray body 122 and tray anchor 124. This will be shown and described in further detail presently. As shown in the bottom plan view of FIG. 11, the studs 200 and 202 extend from depending wall sections 204 and 206, respectively, within tray anchor portion 124. Similarly, extending into recess 166 is a first stud or projection 210 for fitting into opening 194 in tab 162 to define the other end of the pivotal connection between tray body 122 and tray anchor 124. A second stud or projection 212 extends into recess 166 for fitting into opening 196 to define the releasable locking relationship between tray body 122 and tray anchor 124 and which will be shown and described in further detail presently. As shown in FIG. 11, the studs 200 and 202 extend from depending wall sections 214 and 216, respectively, within tray anchor portion 124.

Figure 12:
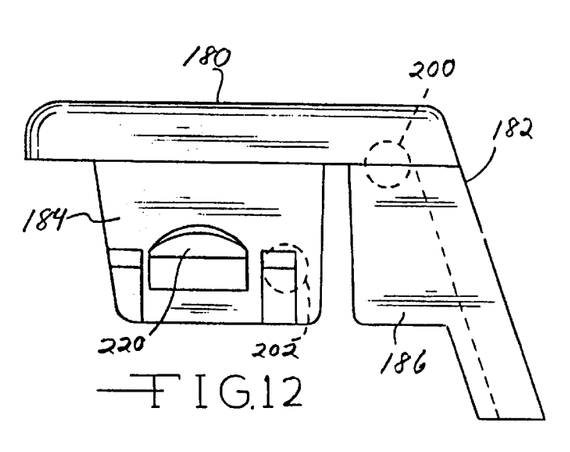
FIG. 12 is an enlarged elevational view taken about on line 12—12 in FIG. 10;.
Figure 13:
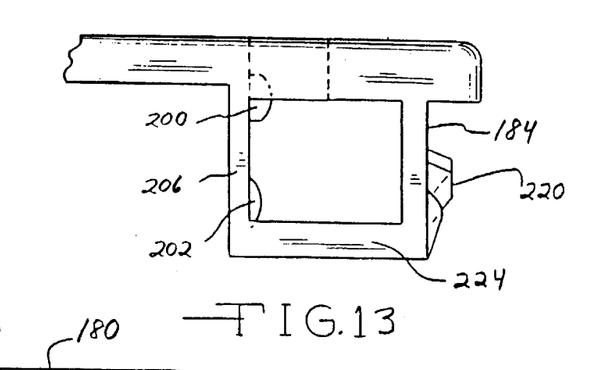
FIG. 13 is an enlarged fragmentary sectional view taken about on line 13—13 in FIG. 10.
Figure 14:
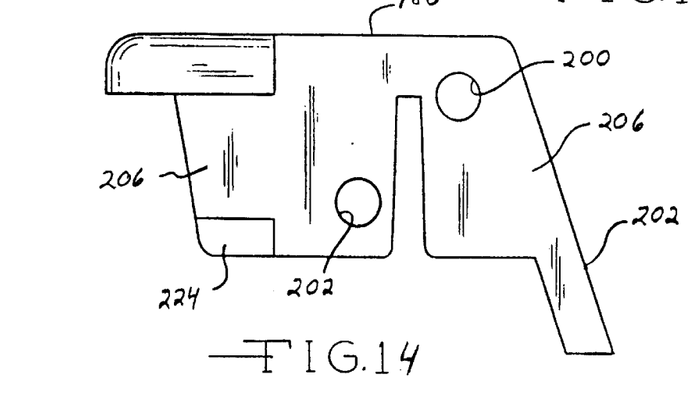
FIG. 14 is an enlarged sectional view taken about on line 14—14 in FIG. 10.

The enlarged view of FIG. 12 shows the wall-like members 184 and 186 extending from walls 180 and 182 as described in connection with FIG. 6. The members 184 and 186 are located a short distance inwardly from one end of anchor portion 124 as shown in FIG. 11. A stud or projection 220 on member 184 is received in an opening (not shown) in the side wall 102 of cover part 84 to secure tray anchor portion 124 in cover part 84. A link member 224 joins member 184 and wall 206 as shown in FIGS. 11, 13 and 14 for a purpose to be described.

In a similar manner, tray anchor portion 124 is provided with a corresponding pair of wall-like members 234 and 236 extending from walls 180 and 182 and located a short distance inwardly from the opposite end of anchor portion 124 as shown in FIG. 11. A stud or projection 240 on member 236 is received in an opening (not shown) in the side wall 104 of cover part 84 to secure tray anchor portion 124 in cover part 84. A link member 244 joins member 234 and wall 216 as shown in FIG. 11 for a purpose to be described.

Thus, by virtue of the foregoing structural arrangement, tray anchor portion 124 and the tray body hinged thereto is readily connected to case 80 comprising cover parts 82 and 84 which case 80 is of the type normally used for holding a single compact disc. In other words, tray body 122 and tray anchor 124, which serve to hold two compact discs, are readily installed in a case 80 of the type designed to hold a single compact disc.

The compact disc carrying case 80 according to the present invention is manufactured and assembled in the following manner. The first and second cover parts 82 and 84, respectively, and the tray body and anchor portions 122 and 124, respectively, are molded from plastic material. The specific molding techniques form no part of the present invention and are well-known to those skilled in the art. Tray body 122 and tray anchor portion 124 then are moved relative to each other from positions shown in FIG. 7 to the assembled condition illustrated in FIGS. 5 and 6. This assembly step includes inserting the arms or tabs 160 and 162 of tray body 122 into the slots or recesses 164 and 166, respectively, of tray anchor 124. When this is completed, studs 200 and 202 on tray anchor 124 snap into openings 190 and 192, respectively, on tab 160 and studs 210 and 212 snap into openings 194 and 196, respectively, on tab 162. As previously described, at this stage of the assembly operation, tray body 122 is fixed and not pivotally movable relative to tray anchor 124.

After tray body 122 and tray anchor 124 are connected together, the combination is assembled with the tray cover part 84. This is done by moving the tray body and anchor combination into position with the ends of anchor portion 124 between the side walls 102 and 104 of cover part 84. As the ends of anchor portion 124 are moved within walls 102 and 104 in a direction away from the opposite edge 100 of cover part 84, the studs or projections 220 and 240 on the opposite ends of tray anchor portion 124 shown in FIG. 11 snap into the previously described openings provided in side walls 102 and 104, respectively, to secure tray anchor 124 to cover part 84. The ends of the studs or projections 220 and 240 are contacted or engaged by the ends of the projections on walls 92 and 94, i.e. projection 108, when cover part 82 is connected to cover part 84 to cause inward movement of each of the structures comprising member 184, link 224 and wall 206 and member 234, link 244 and wall 216. This, in turn, moves the studs 202 and 212 out of the openings 192 and 196 in arms 160 and 162 so that when tray anchor 124 is secured in cover part 84, tray body 122 is pivotally movable in anchor portion 124 as previously described. The thickness of the members and walls and the resiliency of the plastic material permits the foregoing flexural movement.

Figure 15:
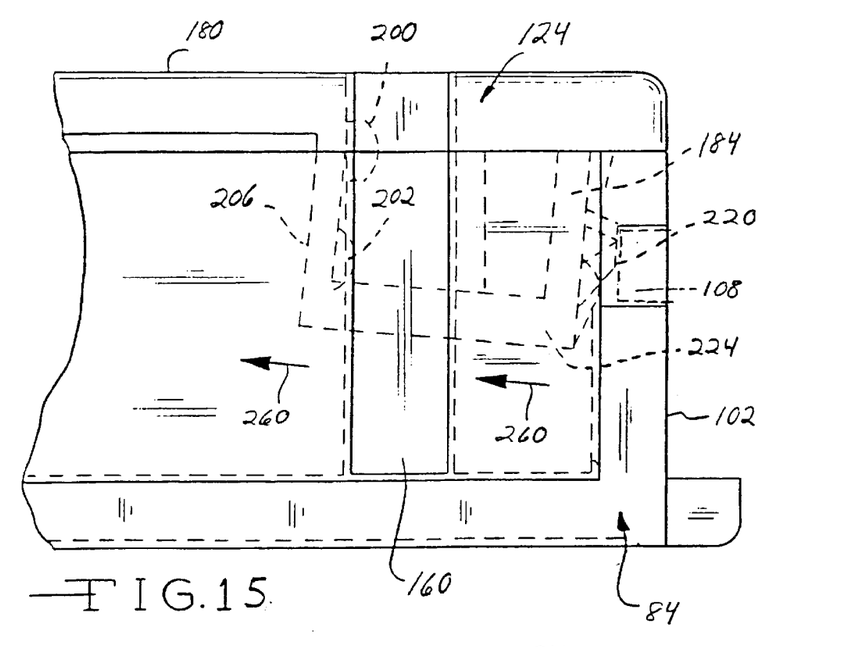
FIG. 15 is an enlarged fragmentary elevational view illustrating assembly of the tray structure of the present invention in a case.
Figure 16:
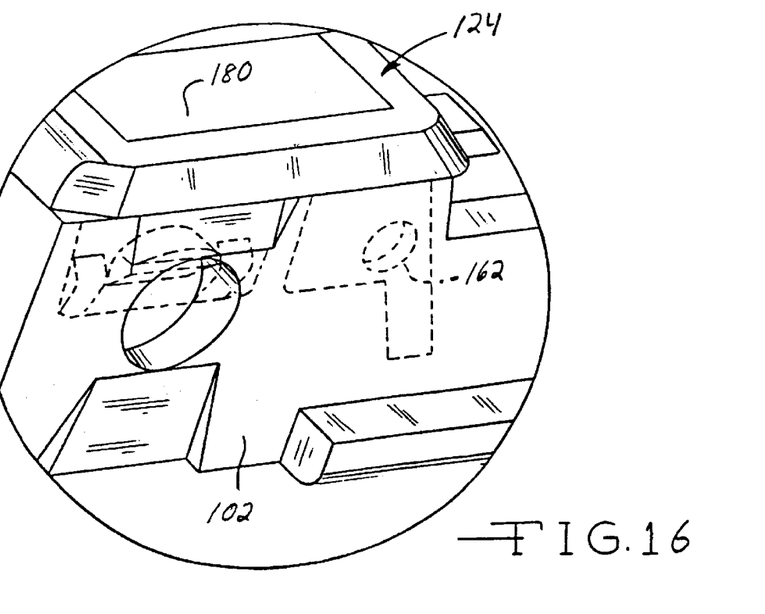
FIG. 16 is an enlarged fragmentary perspective view further illustrating assembly of the tray structure of the present invention in a case.

The foregoing is illustrated in the enlarged views of FIGS. 15 and 16. FIG. 15 illustrates the inward movement in the direction of arrows 260 of the combination of member 184, link 224 and wall 206 caused by the engagement between the end of stud 220 on member 186 and the end of stud 108 on side wall 92 of cover part 84. As can be seen in FIG. 15, stud 202 is moved out of opening 192 in tab 160 while stud 200 is retained in opening 190. FIG. 16 also illustrates an opening 262 through side wall 92 of cover part 84 which receives the studs 220 and 108 as previously described. A similar engagement between the end of stud 240 on member 236 and the end of the stud on side wall 94 of cover part 84 moves the combination of member 234, link 244 and wall 216 inwardly in a direction opposite to that of arrows 260.

The assembly of case 80 is completed by joining the first cover part 82 to the second cover part 84 as previously described and in a manner well-known to those skilled in the art. Alternatively, cover parts 82 and 84 could be first connected together and then the tray anchor-tray body combination connected into cover part 84.

It is therefore apparent that the present invention accomplishes its intended objects. The combination of tray body 122 and tray anchor 124 fits into and is readily and easily installed in a standard or conventional one CD case or box 80. As a result, a conventional one CD case can be converted quickly and easily into a two CD case. Also, there is no need to provide or store in inventory custom cases or boxes specially designed for two CD trays. In addition, the separate tray body 42 and tray anchor 44, together with the nature of the pivotal connection therebetween, provide a structure which is strong and long lasting.

Figure 17:
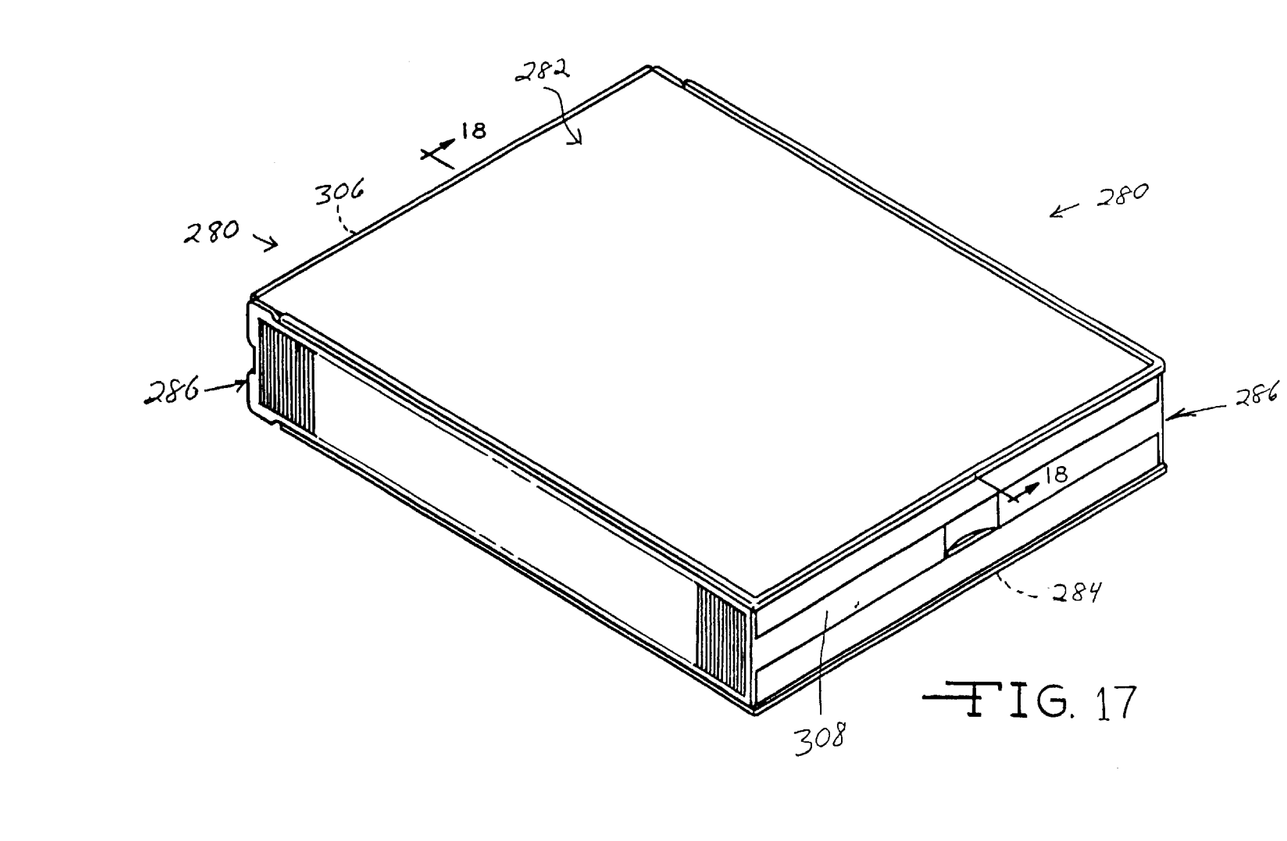
FIG. 17 is a perspective view of a case for holding six compact discs utilizing the principles of the present invention.
Figure 18:
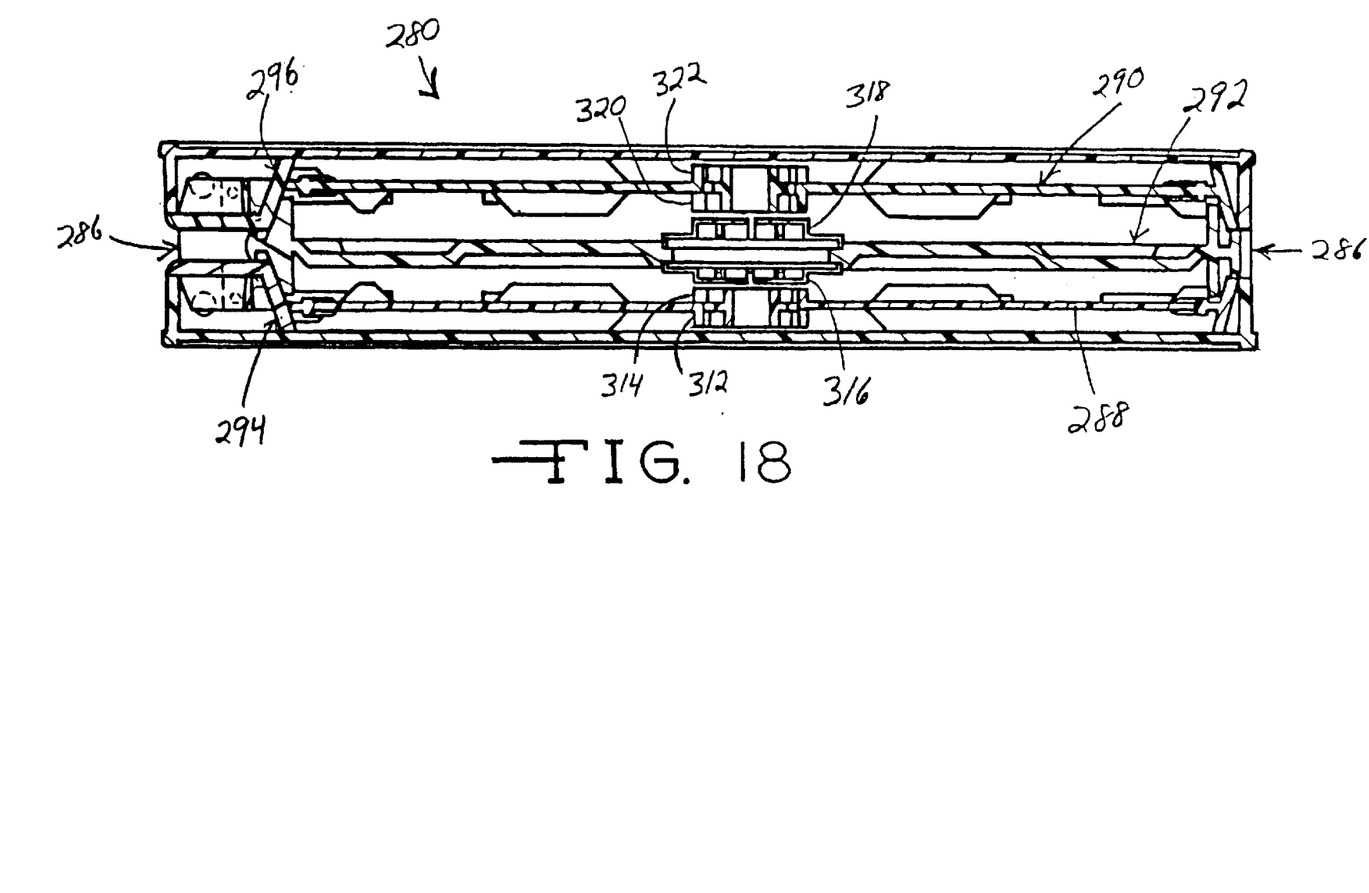
FIG. 18 is a sectional view taken about on lines 18—18 in FIG. 17.
Figure 19:
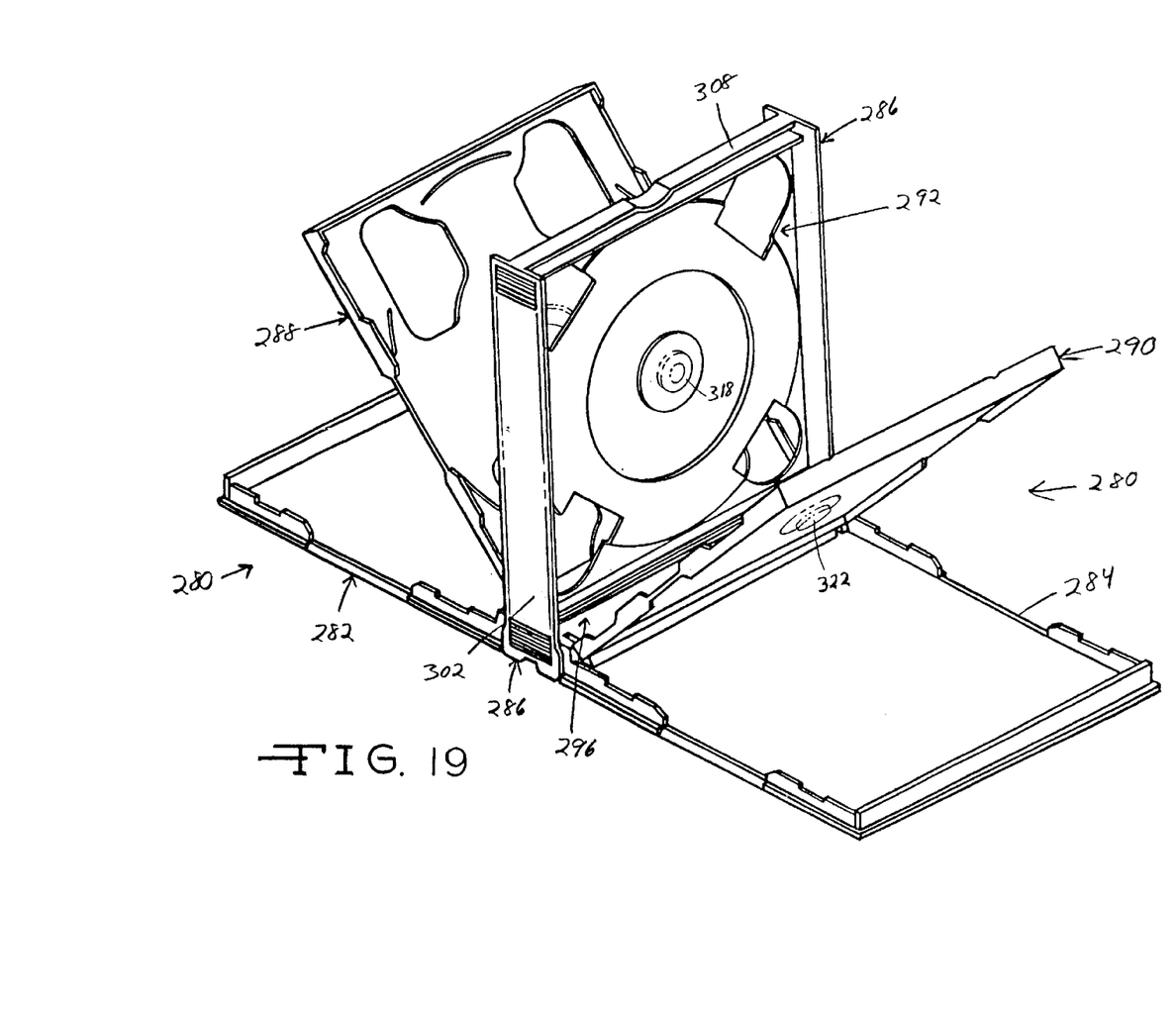
FIG. 19 is a perspective view of the case of FIGS. 17 and 18 in an opened position.

FIGS. 17–19 illustrate a case generally designated 280 for holding six compact discs and utilizing the principles of the present invention. Case 280 includes first and second cover parts 282 and 284, respectively, each pivotally connected to a central frame 286. A first tray 288 is associated with cover part 282, a second tray 290 is associated with cover part 284 and a third tray 292 is carried by frame 286. Each tray holds two compact discs, being provided with an annular array of fingers on each surface thereof.

Cover parts 282 and 284 can be identical to cover parts 82 and 84 in the embodiment of FIGS. 2–16, and each tray 288 and 290 can be identical to tray 122 in that embodiment. Each tray 288 and 290 is pivotally connected to a corresponding tray anchor portion 294 and 296, respectively, which tray anchor portions are identical to tray anchor portion 124 in the embodiment of FIGS. 2–16. Each tray anchor portion 294 and 296, in turn, is connected to its corresponding cover part 282 and 284, respectively, in a manner similar to that by which tray anchor 124 is connected to cover part 84 in the embodiment of FIGS. 2–16. Tray 292 is joined around its periphery to the walls of frame 286 in a suitable manner. Alternatively, tray 292 and frame 286 can be of one piece construction, molded from plastic.

Frame 286 includes a pair of side walls 302 and 304 joined by a pair of end walls 306 and 308. Cover part 282 is pivotally connected to frame side walls 302 and 304 by means of studs or projections (not shown) on the inner surfaces of side walls 302 and 304 pivotally received in openings (not shown) in the side walls of cover part 282. Tray anchor portion 294 has projections or studs (not shown) on opposite ends thereof which are received in the openings in the side walls 302 and 304 of cover part 282. Similarly, cover part 284 is pivotally connected to frame side walls 302 and 304 by means of studs or projections (not shown) on the inner surfaces of side walls 304 and 304 pivotally received in openings (not shown) in the side walls of cover part 284. Tray anchor portion 296 has projections or studs (not shown) on opposite ends thereof which are received in the openings in the side walls 302 and 304 of cover part 284. Thus, tray anchor portions 294 and 296 are secured in the side walls 302 and 304 of cover part in a manner similar to that by which tray anchor portion 124 is secured to cover part 84 in the embodiment of FIGS. 2–16.

As shown in FIG. 18, tray 288 has oppositely directed annular arrays of fingers 312 and 314 each of which releasably holds a compact disc in a known manner. Likewise, tray 290 has oppositely directed annular arrays of fingers 316 and 318 each of which releasably holds a compact disc in a known manner. Similarly, tray 292 has oppositely directed annular arrays of fingers 320 and 322 each of which releasably holds a compact disc in a known manner. Each of the pairs of annular arrays of fingers on the three trays in case 280 can be identical to the annular arrays of fingers 132 and 134 on tray 122 in the embodiment of FIGS. 2–16.

While embodiments of the present invention have been described in detail, that has been done for purposes of illustration, not limitation.

What is claimed is:

1. A case for holding two compact discs comprising:
 a) a first cover part;
 b) a second cover part;
 c) means for pivotally connecting said first and second cover parts together so that said cover parts can be pivoted between a closed position facing each other to an open position, said means comprising first projections on one of said cover parts and first apertures on the other of said cover parts;
 d) said first and second cover parts and said means for pivotally connecting being of the type provided for holding a single compact disc;
 e) a tray comprising a planar body portion and an anchor portion, said tray body portion including means on each surface thereof for releasably securing a compact disc;
 f) means for pivotally connecting said tray body portion and said tray anchor portion together;
 g) second projections on said tray anchor portion cooperatively engaging second apertures on one of said first and second cover parts for securing said tray anchor portion to one of said cover parts;
 h) third projections and apertures on said tray body portion and on said tray anchor portion co-operating with each other and said first projections co-operating with said second projections on said tray anchor portion so that said tray body portion is pivotally movable relative to said tray anchor portion only when said tray anchor portion is secured to said one of said tray cover parts; and
 i) so that when said cover parts are pivoted relative to each other to open said case said tray body portion can be pivoted about said anchor portion to facilitate securing and removing compact discs on either side of said tray portion and so that said tray body portion and said tray anchor portion are readily connected to said cover parts of the type for holding a single compact disc.

2. The case for holding compact discs according to claim 1, further including co-operating structures on said tray body portion, on said tray anchor portion and on said one of said tray cover parts so that said tray body portion is pivotally movable relative to said tray anchor portion only when said tray anchor portion is secured to said one of said tray cover parts.

3. A case for holding a plurality of compact discs comprising:
 a) a frame;
 b) first a second cover parts pivotally connected to said frame;
 c) a first tray associated with said first cover part and having at least one means on a surface thereof for releasably securing a compact disc, said first tray being pivotally connected to a first tray anchor secured to said first cover part by means of a pair of arms extending from said first tray, a pair of recesses in said first tray anchor for receiving said arms and means for pivotally connecting said arms to said first tray anchor;
 d) a second tray associated with said second cover part and having at least one means on a surface thereof for releasably securing a compact disc, said second tray being pivotally connected to a second tray anchor secured to said second cover part by means of a pair of arms extending from said second tray, a pair of recesses in said second tray anchor for receiving said arms of said second tray and means for pivotally connecting said arms of said second tray to said second tray anchor; and
 e) a third tray carried in said frame and having at least one means on a surface thereof for releasably securing a compact disc.

4. The case for holding compact discs according to claim 3, wherein each of said first, second and third trays has means on each surface thereof for releasably securing a compact disc so that said case has the capability of holding six compact discs.

5. A case for holding two compact discs comprising:
 a) a first cover part;
 b) a second cover part;
 c) co-operating apertures and projections on said first and second cover parts for pivotally connecting said first and second cover parts together so that said cover parts can be pivoted between a closed position facing each other to an open position;
 d) said first and second cover parts and said co-operating apertures and projections for pivotally connecting being of the type provided for holding a single compact disc;
 e) a tray comprising a planar body portion and an anchor portion, said tray body portion including means on each surface thereof for releasably securing a compact disc;
 f) said tray body portion and said tray anchor portion being pivotally connected together;
 g) said tray body portion being provided with a pair of spaced-apart openings therein and wherein said tray anchor portion is provided with a pair of spaced-apart studs which are received in said openings so that when said tray body portion and said tray anchor portion are connected together prior to said tray anchor portion being secured to said one of said cover parts, said tray body portion is not pivotally movable relative to said tray anchor portion;

h) a formation on said tray anchor portion for contacting said projection for pivotally connecting said cover parts to move one of said studs in each of said pairs from the opening in the tray body portion so that when said tray anchor portion is secured to said one of said cover parts said tray body portion is pivotally movable relative to said tray anchor portion; and i) each of said pairs of studs being provided on a wall of said tray anchor portion linked to a member provided with said formation thereon for engaging said projection for pivotally connecting said cover parts to provide a camming action to move said wall via said link;

j) so that when said cover parts are pivoted relative to each other to open said case said tray body portion can be pivoted about said anchor portion to facilitate securing and removing compact discs on either side of said tray body portion.

* * * * *